United States Patent
Wipasuramonton et al.

(10) Patent No.: US 7,789,418 B2
(45) Date of Patent: Sep. 7, 2010

(54) CURTAIN AIR BAG ASSEMBLY

(75) Inventors: Pongdet P. Wipasuramonton, Rochester, MI (US); Jeffrey Young, Warren, MI (US); Chang-Hwan Ju, Rochester, MI (US); Prabhakar Padiyar, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 914 days.

(21) Appl. No.: 11/397,130

(22) Filed: Apr. 4, 2006

(65) Prior Publication Data

US 2006/0255570 A1   Nov. 16, 2006

Related U.S. Application Data

(60) Provisional application No. 60/679,593, filed on May 10, 2005.

(51) Int. Cl.
*B60R 21/233* (2006.01)
*B60R 21/26* (2006.01)

(52) U.S. Cl. .................... 280/730.2; 280/729; 280/740; 280/743.1

(58) Field of Classification Search .............. 280/730.2, 280/736, 740, 742, 743.1, 729
See application file for complete search history.

(56) References Cited

U.S. PATENT DOCUMENTS

| | | | |
|---|---|---|---|
| 3,784,223 A | 1/1974 | Hass et al. | |
| 3,792,873 A | 2/1974 | Buchner et al. | |
| 5,529,332 A | 6/1996 | Wipasuramonton | |
| 6,199,898 B1 * | 3/2001 | Masuda et al. | ........... 280/730.2 |
| 6,231,073 B1 | 5/2001 | White, Jr. | |
| 6,237,940 B1 | 5/2001 | Shirk et al. | |
| 6,237,941 B1 | 5/2001 | Bailey et al. | |
| 6,260,878 B1 * | 7/2001 | Tanase | ..................... 280/730.2 |
| 6,293,581 B1 * | 9/2001 | Saita et al. | ............... 280/730.2 |
| 6,336,654 B1 | 1/2002 | Stein et al. | |
| 6,439,604 B1 | 8/2002 | Al-Amin et al. | |
| 6,450,527 B2 | 9/2002 | Kobayashi et al. | |
| 6,450,529 B1 | 9/2002 | Kalandek et al. | |

(Continued)

FOREIGN PATENT DOCUMENTS

DE     20216339 U1     2/2003

(Continued)

*Primary Examiner*—Toan C To
*Assistant Examiner*—George D. Spisich
(74) *Attorney, Agent, or Firm*—Markell Seitzman

(57) ABSTRACT

An air bag assembly comprising: an inflator for providing a source of inflation gas, and an air bag having a first end and a second end and a first side and a second side, the air bag configured to have a first inflatable chamber proximate the first end, a second inflatable chamber proximate the second and a non-inflatable region therebetween; the air bag including an inlet communicated with the inflator, the air bag further including a plurality of joints or seams, which connect selective regions of the first and second sides together thereby controlling the inflatable volume of the air bag, a top portion of each of the plurality of joints or seams located a determinable distance from a top of the air bag to form within the air bag an integral gas flow path or channel, the inlet generally positioned spaced from a top of the air bag and generally located between the first inflatable chamber and second Inflatable chamber.

2 Claims, 6 Drawing Sheets

U.S. PATENT DOCUMENTS

| | | | |
|---|---|---|---|
| 6,474,678 | B1 | 11/2002 | Boxey |
| 6,623,031 | B2 | 9/2003 | Haland et al. |
| 6,695,347 | B2 | 2/2004 | Sonnenberg et al. |
| 6,796,583 | B2 | 9/2004 | Keshavaraj |
| 6,802,530 | B2 | 10/2004 | Wipasuramonton et al. |
| 6,811,184 | B2 * | 11/2004 | Ikeda et al. ............... 280/742 |
| 6,863,089 | B2 * | 3/2005 | Kitamura et al. ........... 138/126 |
| 6,877,771 | B2 * | 4/2005 | Weber ....................... 280/742 |
| 6,899,350 | B2 * | 5/2005 | Bakhsh et al. ........... 280/730.2 |
| 7,040,652 | B2 * | 5/2006 | Ogata et al. ............. 280/730.2 |
| 7,147,244 | B2 * | 12/2006 | Takahara ................. 280/730.2 |
| 7,370,882 | B2 * | 5/2008 | Tokunaga et al. ........ 280/730.2 |
| 2002/0014762 | A1 | 2/2002 | Bakhsh et al. |
| 2002/0140211 | A1 | 10/2002 | Takahara |
| 2003/0090095 | A1 * | 5/2003 | Takahara ................... 280/740 |
| 2003/0094798 | A1 | 5/2003 | Ogata et al. |
| 2003/0132615 | A1 | 7/2003 | Henderson |
| 2003/0218324 | A1 | 11/2003 | Ju et al. |
| 2004/0100076 | A1 | 5/2004 | Holtz |
| 2004/0104561 | A1 * | 6/2004 | Maertens ................. 280/730.2 |
| 2004/0104563 | A1 * | 6/2004 | Fischer .................... 280/743.1 |
| 2004/0232664 | A1 | 11/2004 | Tokunaga et al. |
| 2005/0023807 | A1 | 2/2005 | Kino et al. |

FOREIGN PATENT DOCUMENTS

| | | |
|---|---|---|
| GB | 2397806 A | 8/2004 |
| JP | 2002-370601 | 12/2002 |
| JP | 2003-146174 | 5/2003 |
| JP | 2003-320920 | 11/2003 |
| JP | 2004-067045 | 3/2004 |
| JP | 2004-082951 | 3/2004 |

* cited by examiner

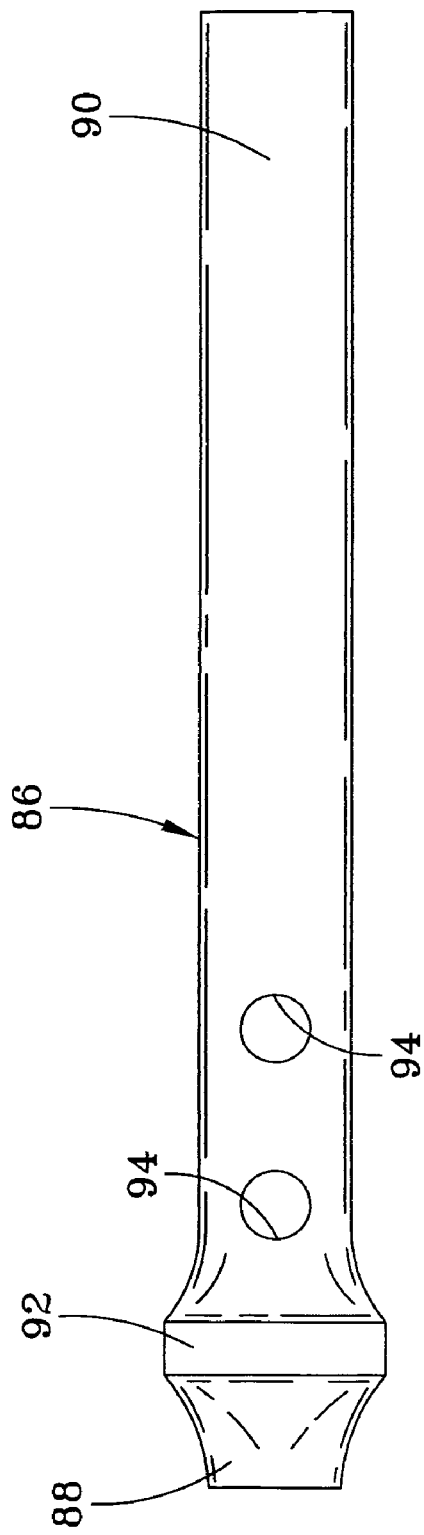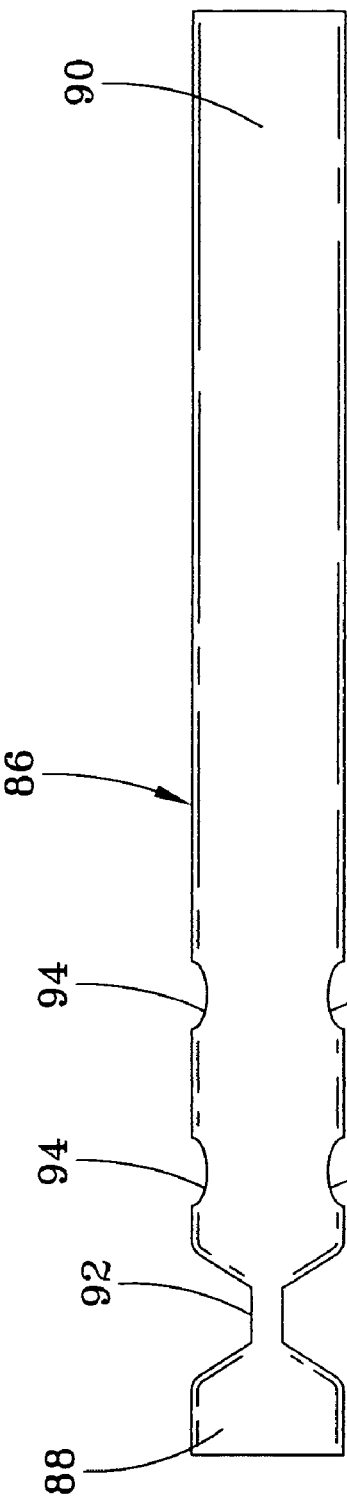
FIG-5
FIG-5a

CURTAIN AIR BAG ASSEMBLY

This application claims the benefit of U.S. Provisional Application 60/679,593, filed on May 10, 2005. The disclosure of the above application is incorporated herein by reference.

BACKGROUND AND SUMMARY OF THE INVENTION

The present invention relates to safety restraint systems for vehicles and more particularly to an improved curtain-style air bag.

It is an object of the present invention to provide an improved air bag assembly.

Accordingly the invention comprises: an air bag assembly having a source of inflation gas, and an air bag having a first end and a second end and a first side and a second side, the air bag configured to have a first inflatable chamber proximate the first end, a second inflatable chamber proximate the second end and a non-inflatable region therebetween; the air bag including an inlet communicated with an inflator, the air bag further including a plurality of joints or seams, which connect selective regions of the first and second sides together, thereby controlling the inflatable volume of the air bag; a top portion of each of the plurality of joints or seams located a determinable distance from a top of the air bag to form, within the air bag, an integral gas flow path or channel, the inlet generally positioned spaced from and in communication with a top of the air bag and generally located between the first inflatable chamber and second inflatable chamber.

Many other objects and purposes of the invention will be clear from the following detailed description of the drawings.

BRIEF DESCRIPTION OF THE DRAWINGS

FIGS. 5 and 5a illustrate a solid fill tube.

DETAILED DESCRIPTION OF THE DRAWINGS

Figure 1:
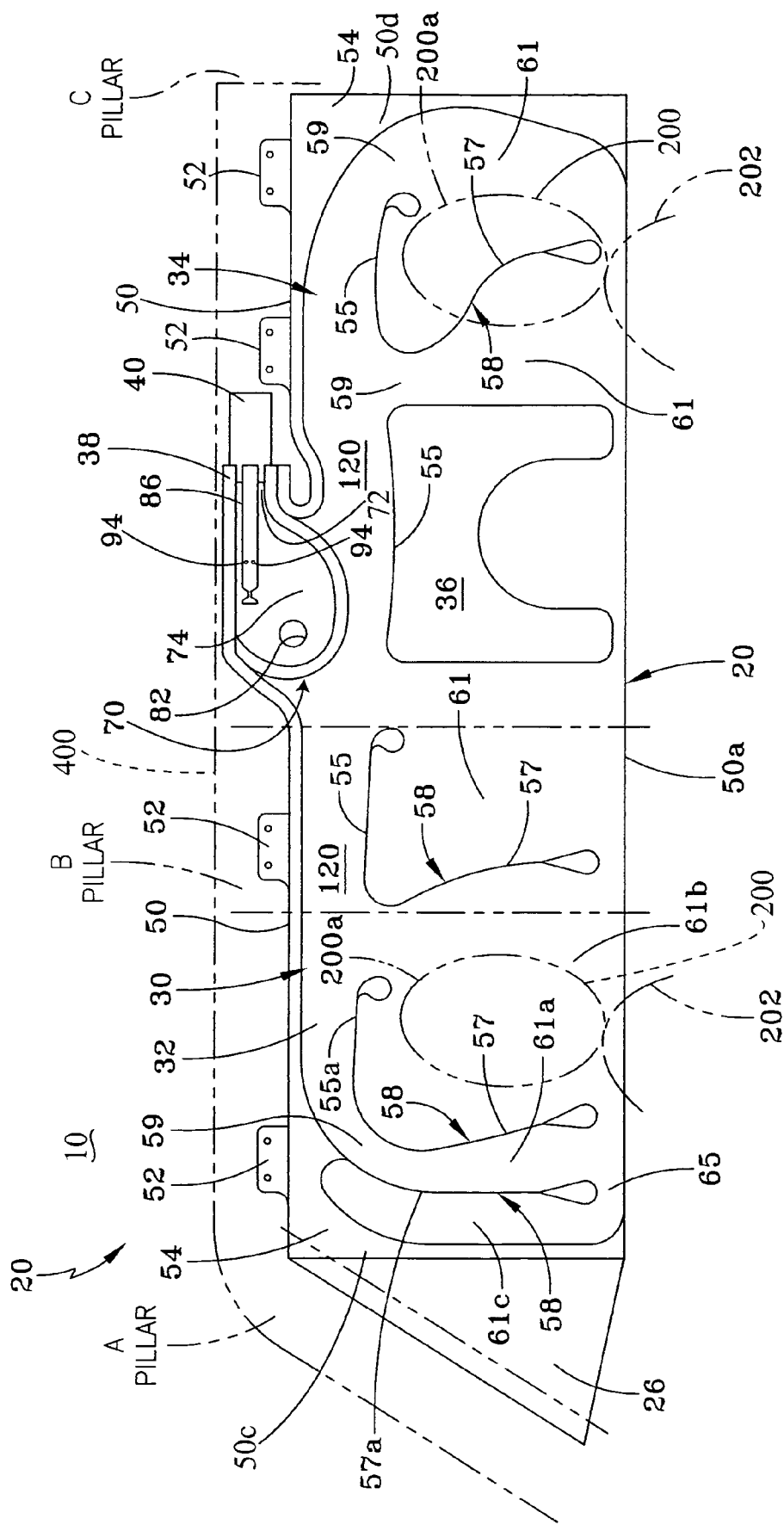
FIG. 1 is a plan view of the first embodiment of the present invention.
Figure 2:
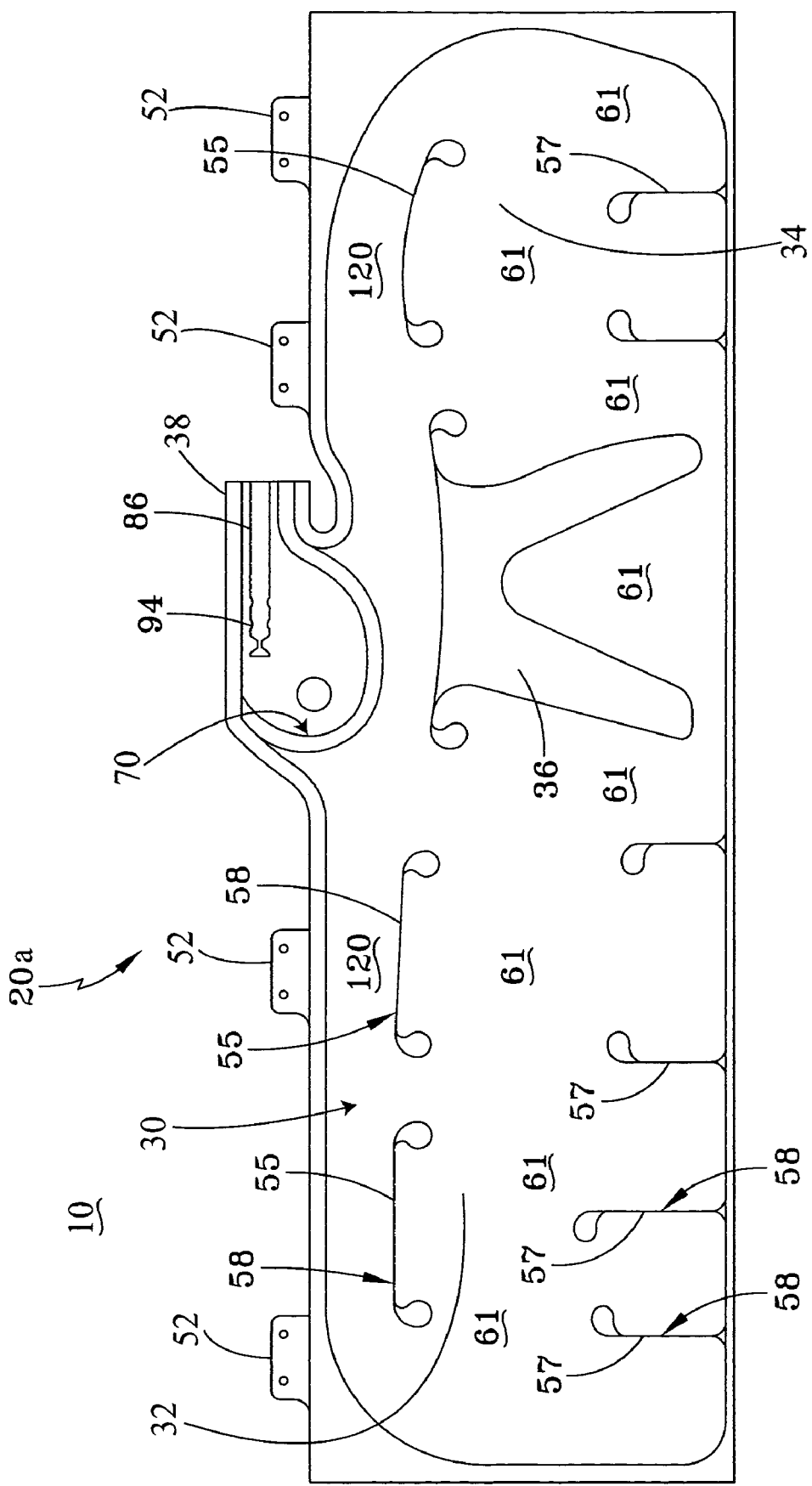
FIG. 2 is a plan view showing a second embodiment of the present invention.

FIGS. 1 and 2 show versions of a center-fill curtain air bag 20 and 20a. As is known in the art, a curtain air bag is typically arranged to lie along the roof rail of a vehicle, above the vehicle door or doors. The air bag is typically maintained in a folded condition along the roof rail 400 and covered by a protective housing or trim piece (not shown) at the roof rail. The air bag deploys through this protective housing or trim piece in a manner as a curtain (or Venetian blind) to cover the interior side of the passenger compartment to protect the head and shoulder of the occupant, shown in phantom line, see numerals 200 and 202. Each of the air bags 20 and 20a has an inflatable volume 30 separated into inflatable portions. The inflatable volume 30 in the illustrated embodiments is subdivided into a forward 32 and/or rearward 34 inflatable volume separated by a large uninflatable region 36. Each air bag includes an inlet 38 arranged between the forward and rearward inflatable volumes or chambers; the inlet 38 is communicated to a source of inflation gas such as an air bag inflator 40.

The top (or top portions) 50 of the inflatable parts of the air bag is formed with a plurality of tabs 52, permitting the air bag to be mounted to and secured to the roof rail. As is known in the art, each air bag such as 20 and 20a is formed utilizing woven material configured to inflate upon receipt of inflation gas. Either air bag can be manufactured utilizing a one-piece-woven technique in which the air bag is made on a Jacquard loom. This known type of weaving technique creates peripheral non-inflatable regions or edge borders such as 54, the non-inflatable region 36, and various joints, seams or tethering links 58, which join the inner and outer panels of the air bag together. The inner and outer panels form two opposing sides. Upon inflation, the outer panel or outer side 28b will lie adjacent the door or vehicle interior facing side 402, and inner panel or inner side 28a will face the interior of the passenger compartment of the vehicle (see FIG. 8). The seams or joints 58 are employed to reduce the inflatable volume of the air bag as is known in the art. The edge border, non-inflatable regions and joints could be formed if the air bag were constructed using a more conventional sewing technique, as also known in the art.

The various joints or seams 58 are separated from non-inflatable region 36, and edge border 54 subdivides the forward and rearward inflatable volumes 32 and 34 into adjacent inflatable regions 61, 61a, 61b and 61c. The top portions (tops) 55 of each joint or seam 58 are spaced from the top 50 of the air bag and form a distribution channel 120 for inflation gas. In FIG. 1 many of the joints or seams 58 are configured with a flat top 55 and descending leg 57. The spacing between each individual joint or seam 58 and the spacing between each joint or seam and the top and bottom of the air bag is chosen to control the flow of inflation gas to each of the inflatable regions 61. For example, the spacing of a top portion 55a of one of the joints 58 relative to the top of the air bag is made to initially reduce the gas flow to an inflatable region such as 61a that is situated in front of the region 61b, which is adjacent the head of an occupant seated in the front seat of the vehicle. By restricting the gas flow to region 61a (and region 61c), the gas flow to the region 61b is increased, causing the inflatable regions of the air bag adjacent the head of an occupant to be protected to inflate more rapidly and be positioned adjacent the occupant to protected.

As mentioned above, the top 55 of each seam 58 forms the integral distribution, flow, or gas channel 120. The descending leg portion 57 of each seam separates the forward and rearward inflatable regions of the air bag into the smaller regions 61, 61a, 61b, and 61c, as mentioned above. The top portions 55 of each joint 58 are spaced from one another to provide openings 59 within the channel 120, permitting inflation gases to descend into the adjacent inflatable regions 61-61c. The forward most inflatable region 61c is between a forward border 54 and leg 57a. The entrance to region 61c is through a small opening 65 located at the bottom 50a of the air bag. During inflation of the air bag the inflation of this forward region will be delayed relative to the inflation of regions proximate the location of the occupant's head 200a such as, for example, region 61b.

The forward border 54 of the air bag is connected to the A-pillar of the vehicle through a flexible panel 26 of (air bag) material, which need not be inflatable. The inflator 40 is mounted to the roof rail in an appropriate manner and the rear border 54 is adapted to be mounted to a rear pillar of the vehicle such as at the C or D pillar of the vehicle.

Figure 3:
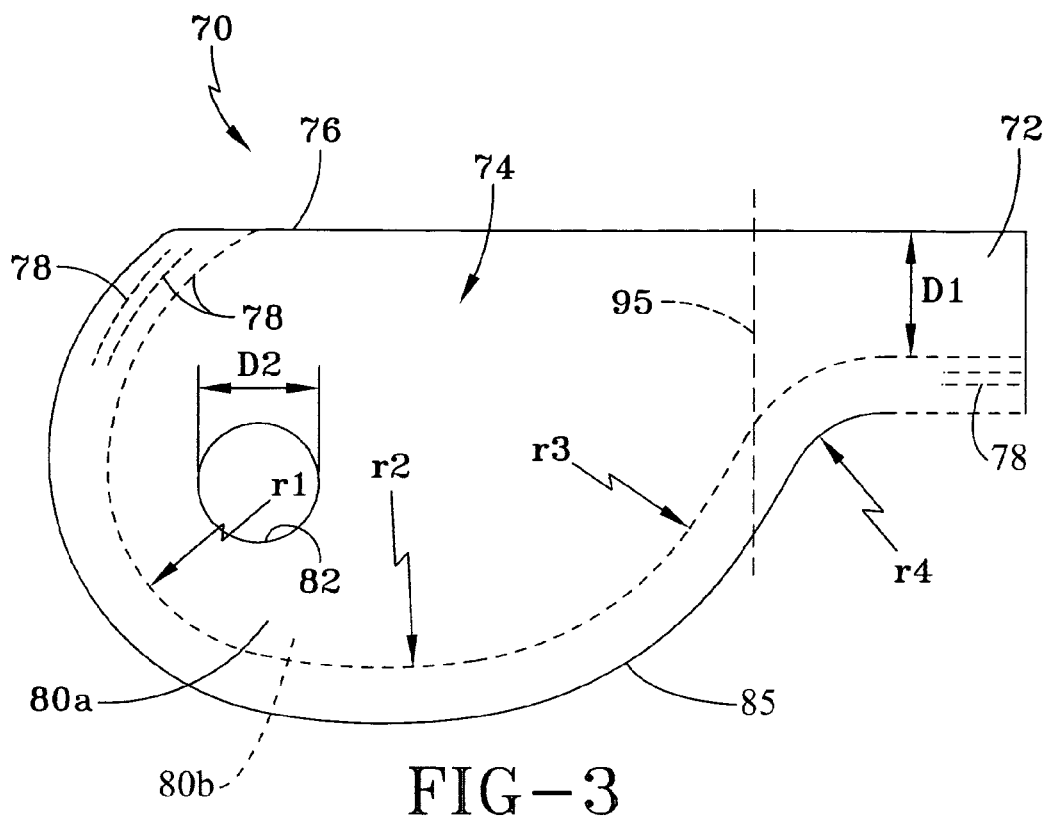
FIG. 3 is a plan view of a diffuser.

The inlet 38 is generally elevated relative to the top portions 50 of the inflatable regions of the air bag and is adapted to be connected to an inflator 40. Air bag 20 (as well as air bag 20a) includes a diffuser 70. As illustrated in various figures, the diffuser includes a neck 72 and a chamber 74; the neck is also adapted to communicate with the inflator 40. In FIG. 3, which shows the diffuser in a flat, uninflated condition, the neck 72 is shown having a diameter of D1. The neck 72 is in communication with a larger volume or chamber 74.

In the illustrated embodiment the diffuser 70 is constructed of a double layer of woven fabric (630 denier), which is folded about a centerline 76 and sewn, typically multiple times, together along one or more seams 78 to provide the shape as illustrated. In the preferred embodiment the double layer of material forming the diffuser 70 is laser cut, the laser cut line in essence welding the woven (nylon) fabric together along the registered edges 85. As can be appreciated, the diffuser 70 has two sides 80a and 80b; only side 80a can be seen in FIG. 3. Each side includes an opening 82 having a diameter D2. The seams 78 forming chamber 74 are arranged to provide chamber 74 with a generally concave shape. Generally the seams are arranged to provide the diffuser with a shape provided by radii such as r1, r2, r3 and r4. Radii r1, r2 and r3 are approximately, but not limited to, 70, 100 and 80 mm. As can be seen, the seams also form a curved transition, generally of radius r4 from chamber 74 to the neck 72. The arrangement of the seams 78 in this transition region provides a generally concave construction except in the r4 region.

Reference is briefly made to FIG. 2. Air bag 20a is of similar construction to air bag 20. The leg portions 57 of seams 58 are not connected to the top sections 55. In this embodiment, the leg portion 57 generally extends radially inward from an outer edge of the inflatable portions of the air bag. The regions of the air bag between the upper portions 55 and leg portions 57 define the various inflatable regions 61 of the air bag.

Figure 4:
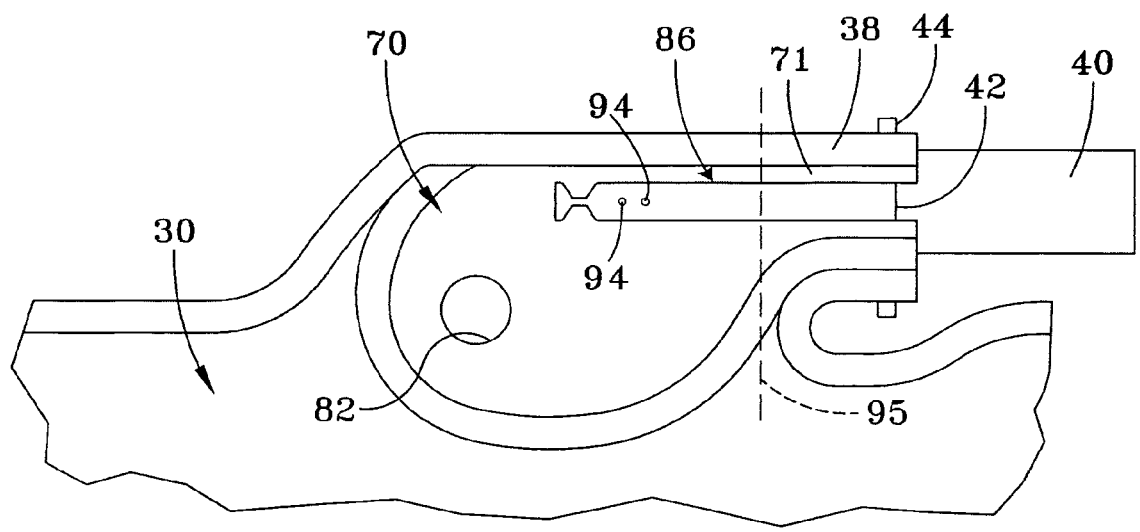
FIG. 4 is an enlarged view of FIGS. 1 and 2 showing the connection between an inflator and a fill tube.

FIG. 4 is an enlarged view of the inlet area of the air bag illustrated in FIGS. 1 and 2. As can be more clearly seen in FIG. 4, the inflator 40 includes an exit port 42, shown diagrammatically, which is connected to a fill tube generally shown as 86. Inflator 40 is preferably an axial flow inflator in which inflation gas exits the inflator or an adaptor secured to the inflator in an axial manner.

A fill tube 86 is illustrated in FIGS. 1, 2, and 3 as well as in FIGS. 5 and 5a. Fill tube 86 is constructed of a hollow, metal tube, preferably non-flexible, having a circular cross-section and an end 88 and an opposite end 90. The tube, proximate end 88, is crimped generally preventing airflow through open end 88. The crimp is shown by numeral 92. Tube 86, upstream of crimp 92, includes at least one set of exit ports 94; each port is located on an opposite side of the tube. In the illustrated embodiment the tube includes two sets of openings 94. End 90 is hollow and circular in cross-section and adapted to be fitted to an exit port 42 of the inflator 40. As can be appreciated, tube 86 can be connected to the inflator 40 utilizing an intermediate connection member such as crimping or by using a clamp. The inlet 38 of the air bag 20, as well as the neck 72 of the diffuser 70, is secured about the inflator 40 by a clamp 44, as shown in FIG. 4.

In the illustrated embodiment of the invention, each of the openings 94 is oriented relative to the air bag such that inflation gases exit the tube 86 into the diffuser 70 in a side-to-side manner. Additionally, the exit ports 94 of the tube 86 are located generally downstream of the transition between the convex and concave regions of the diffuser; this transition is shown by phantom line 95. The convex portion of the diffuser is characterized by having a relatively smaller diameter than that of the concave portions of the diffuser. By positioning the exit ports 94 at or downstream of the transition region, hoop stress generated within the diffuser is controlled. As is known in the art, hoop stress is directly proportional to pressure and diameter while indirectly proportional to the thickness of the material. As can be appreciated, gas flow through the end 88 is axial in nature; the gas flow exiting the ports has a significant component that is perpendicular (radial) to the axial flow. In this manner, the tube also serves to convert the gas flow from axial to radial or substantially radial in view of the crimp 92. As can also be appreciated, the gas exiting the ports 94 may not be totally radial as a portion of the flow exiting the ports may still contain an axial component, generally due to the forward movement of the inflation gas.

One of the benefits of using the crimped hollow tube, such as illustrated above, is the crimping process does not introduce sharp edges on the tube 86. End 88, after crimping, remains smooth although somewhat deformed or elliptical in cross-section.

Figure 6:
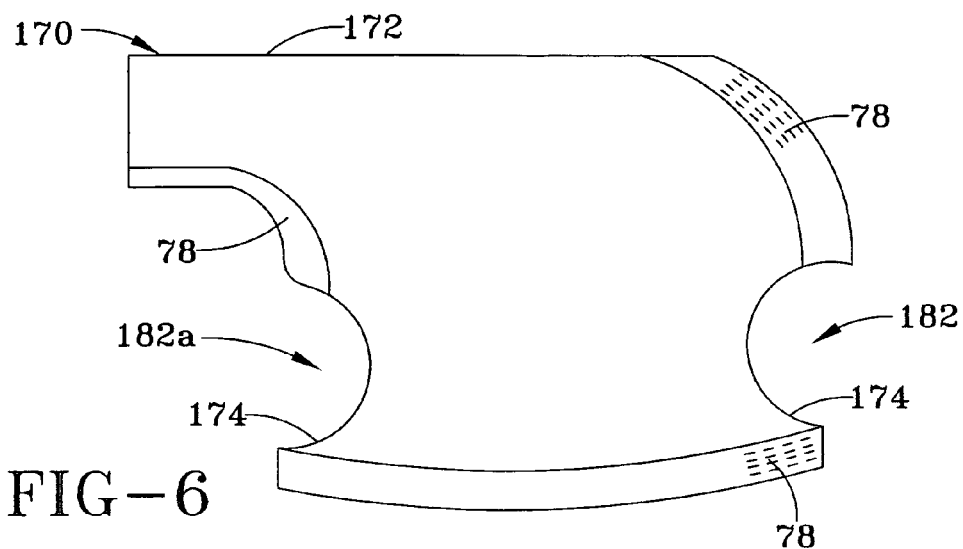
FIG. 6 shows an alternate embodiment of the diffuser.

Reference is briefly made to FIG. 6, which illustrates an alternate embodiment of a diffuser generally shown as 170. The diffuser 170 is generally constructed in the same manner as is diffuser 70 in which one or more panels of material are cut, folded over a centerline 172 and sewn together at various regions by a seam 78. In the preferred embodiment the material is fabricated utilizing two overlapping layers of a 630 denier uncoated woven nylon fabric. The seams 78 are constructed by utilizing a plurality of four (4) adjacent chain stitches. The diffuser 170 of FIG. 6 has two semicircles 174 cut in the opposing layers of material. After the diffuser 170 is sewn together and inflated, the opposing semicircles 174 will form generally circular exit ports 182 and 182a positioned at the front and rear of the diffuser 170. In use, diffuser 170 is mounted to the air bag 20 or air bag 20a in the same way as illustrated in FIGS. 1 and 2 for diffuser 70, but with openings or ports 182 and 182a positioned pointing fore and aft relative to the air bag.

Figure 7:
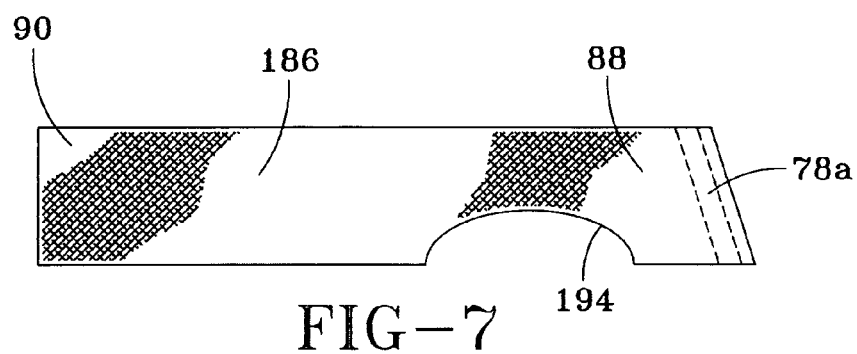
FIGS. 7 and 7a show alternate embodiments of a fill tube.
Figure 7A:
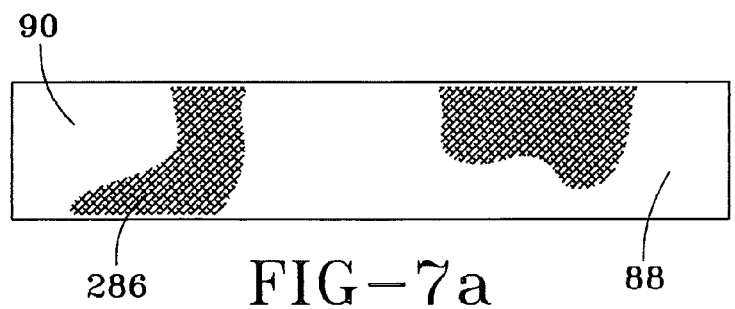

Reference is briefly made to FIGS. 7 and 7a, which illustrate alternate embodiments of a fill tube 186 and 286. Each of these fill tubes is manufactured utilizing a cylinder of woven fabric having an end 90 adapted to be connected to the inflator and an end 88. In FIG. 7 end 88 is sewn closed by one or more seams 78a. The head of the fill tube 186 of FIG. 7 also includes an exit port 194 configured as a generally semicircular cutout in tube 186. The exit port 194, when mounted within diffuser 70, is located downstream of the transition region 95 in a manner similar to the placement of ports 94. In the embodiment shown in FIG. 7a, end 88 of tube 286 is open. This open end 88 is located downstream of the transition region 95 in a manner similar to the placement of ports 94.

The operation of the present invention is as follows. Upon sensing an actual or impending side impact of the vehicle, an ignition signal is sent from a control unit to an igniter associated with the inflator 40. Thereafter, inflation gas is produced and/or released. As is known in the art, certain inflators include a quantity of stored gas, the release of which begins the inflation of the air bag; while other inflators include a solid propellant which must burn to generate inflation gas; while still other inflators include a combination of stored gas and propellant (a solid or other type of propellant).

As mentioned above, the inflator 40 of the present invention is preferably an axial flow inflator in which inflation gas exits the inflator in an axial direction generally in alignment with the axis of the inflator. Inflation gas enters the fill tube such as 86, 186 or 286. During the initial moments of inflation, the inflation gases exiting the inflator are often of an extremely high temperature and pressure. The fill tube directs the inflation gas to enter the diffuser 70 at a large diameter portion of the diffuser 70; this operation isolates the narrow diameter portion of the diffuser 70 from the intense pressure and temperature of the inflation gas.

Figure 8:
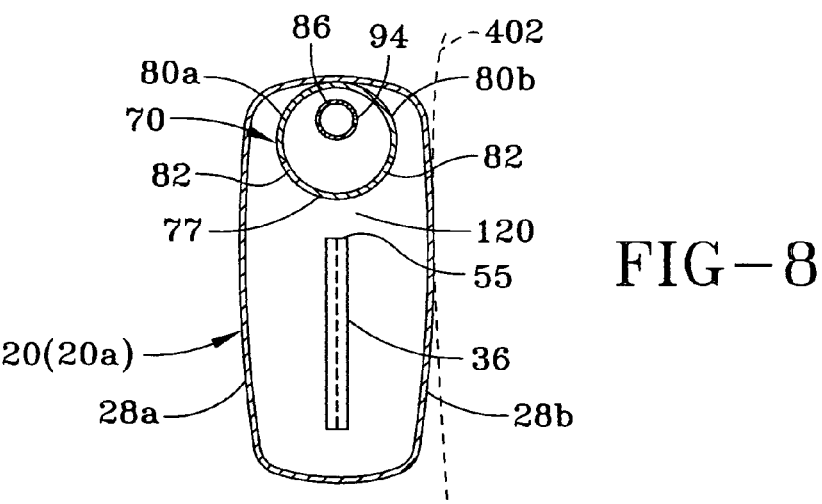
FIG. 8 is a cross-sectional view showing portions of the diffuser, fill tube and air bag.

One class of air bag inflators is called a cold-gas inflator. In this class of inflators, unheated compressed gas is communicated to the air bag. Prior to activating the inflator, the stored, compressed gas is at ambient temperature, which is generally in the range of −40 F to about 140 F. In this class of inflators, the stored inflation gas is not heated as it flows out of the inflator. The igniter of this inflator is typically used to open up a port, thereby permitting the stored gas to enter into the air bag. Even though the function of the igniter is limited to opening the port, such as breaking a frangible disk, the igniter generates a significant though short-lived intense rise in temperature, well above the ambient range identified above. The construction of the present invention also protects the air bag from the above type of temperature rises. Reference is briefly made to FIG. 8, which illustrates a cross-sectional view of either air bag 20 or 20a with the air bag inflated. As can be seen upon inflation, diffuser 70 also inflates and assumes a more circular or elliptical shape as it presses against the top of the panels 24a and 24b of the air bag 20. As can be seen, the lower edge 77 of diffuser 70 moves upwardly from its uninflated condition toward and generally in line with the top 50 of the air bag 20 (20a), which more fully opens the flow path for gas channel 120 located at the top of the air bag.

Figure 9:
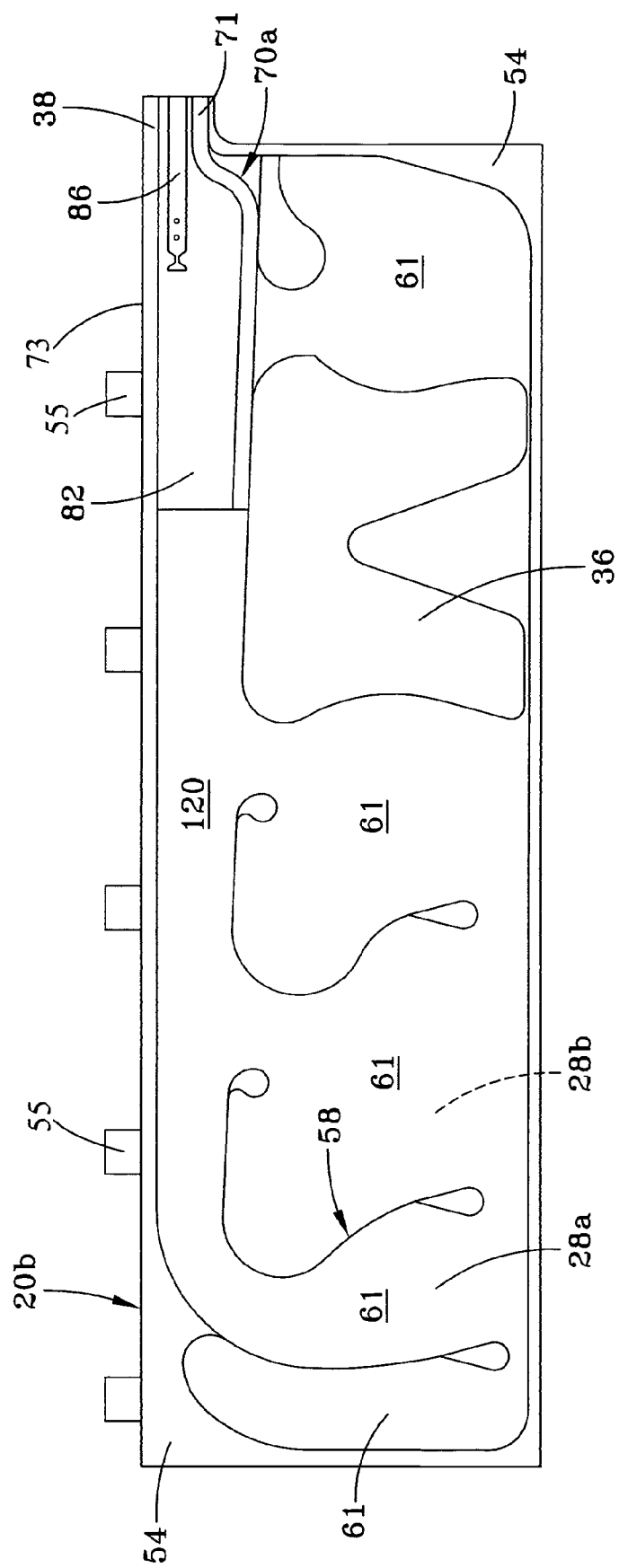
FIG. 9 shows an alternate embodiment of the invention.

Reference is briefly made to FIG. 9, which shows another embodiment of the present invention. Air bag 20c is substantially identical to air bag 20. A major difference between these air bags is the inlet 38 has been moved to a rear of the air bag 20b. The diffuser 70a includes a narrowed neck portion 71 as does diffuser 70, however, diffuser 70a is substantially more elongated and cylindrically shaped than diffuser 70. The central portion 73 of diffuser 70a forms, when inflated, a tapered cylinder. Additionally, the outlet port for passage 82 of diffuser 70a is formed by the generally open-ended construction of diffuser 70a.

Many changes and modifications in the above-described embodiment of the invention can, of course, be carried out without departing from the scope thereof. Accordingly, that scope is intended to be limited only by the scope of the appended claims.

The invention claimed is:

1. An air bag assembly (10) comprising:
   an inflator (40) for providing a source of inflation gas, and an air bag (20, 20a, 20b) having a first end and a second end (50c, 50d) and a first face or side (28b) and a second face or side (28a), the air bag configured to have a first inflatable chamber (32) proximate the first end, a second inflatable chamber (34) proximate the second and a non-inflatable region (36) therebetween; the air bag including an inlet (38) communicating with the inflator (40), the air bag further including a plurality of joints or seams (58) which connect selective regions of the first and second faces (28a, 28b) together thereby controlling the inflatable volume of the air bag, a top portion (55) of each of the plurality of joints or seams located a determinable distance from a top (50) of the air bag to form within the air bag an integral gas flow path or channel (120), the inlet (38) generally positioned spaced from the top of the air bag (50) and generally located between the first inflatable chamber and second inflatable chamber;
   the air bag further including a diffuser formed of a flexible material including woven cloth, the diffuser including two opposing sides or panels of material each having a curved forward end, a curved rearward end and a curved lower portion below the forward and rearward ends; the forward end of each panel proximate the lower portion includes a first matching cut-out profile, the rearward end of each panel proximate the lower portion includes a second matching cut-out profile, a first edge seam joins the forward ends of each panel together, the panels in the vicinity of the first matching cut-out profiles are not joined together, a second edge seam joins the rearward ends of each panel together, the panels in the vicinity of the second matching cut-out profiles are not joined together, a third edge seam joining the lower portions of the panels together, the first and second matching profiles being above the third edge seam, the second edge seam forming a neck of the diffuser to receive gas, the joined forward ends facing one end of the air bag, the joined rearward ends facing the other end of the air bag;
   wherein the first inflatable chamber is divided into three compartments, a first or larger volume compartment including a first opening to the gas flow path along a top of the first compartment, a second compartment smaller than the first compartment, positioned in front of the first compartment and including a second opening to the gas flow path along the top of the second compartment, the second opening being smaller than the first opening to retard gas flow to the second compartment and encourage gas flow to the first compartment, and a third compartment, being closed along a top thereof, positioned forward of the second compartment and rearward of the first end, the third compartment being open along a bottom region of the third compartment so that gas filling the third compartment must flow along a circuitous path through at least the second compartment prior to entering the third compartment.

2. The assembly according to claim 1 wherein bottom regions of the first and the second compartments are open.

\* \* \* \* \*